US008150007B2

(12) United States Patent
Didcock

(10) Patent No.: US 8,150,007 B2
(45) Date of Patent: Apr. 3, 2012

(54) FULLY REDUNDANT CALL RECORDING

(75) Inventor: Clifford N. Didcock, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1322 days.

(21) Appl. No.: 11/788,550

(22) Filed: Apr. 20, 2007

(65) Prior Publication Data
US 2008/0260116 A1  Oct. 23, 2008

(51) Int. Cl.
*H04M 15/00* (2006.01)
(52) U.S. Cl. ............ 379/112.02; 379/88.18; 379/221.04
(58) Field of Classification Search .................. 709/203; 379/67.1, 112.02, 221.04
See application file for complete search history.

(56) References Cited

U.S. PATENT DOCUMENTS

| | | | |
|---|---|---|---|
| 5,260,986 A | 11/1993 | Pershan | |
| 6,137,862 A | 10/2000 | Atkinson et al. | 379/34 |
| 6,560,222 B1 | 5/2003 | Pounds et al. | 370/353 |
| 6,697,858 B1 | 2/2004 | Ezerzer et al. | 709/224 |
| 6,954,518 B1 | 10/2005 | Geen et al. | 379/88.17 |
| 7,158,509 B2 | 1/2007 | Beyda | 370/352 |
| 2005/0021849 A1 | 1/2005 | Hipfinger | 709/239 |
| 2005/0105697 A1 | 5/2005 | Hollowell et al. | 379/88.13 |
| 2005/0238148 A1 | 10/2005 | Poustchi et al. | 379/88.17 |
| 2008/0052344 A1* | 2/2008 | Alecci et al. | 709/203 |

FOREIGN PATENT DOCUMENTS

| | | |
|---|---|---|
| EP | 0804010 A2 | 10/1997 |
| WO | WO 2004/057846 A1 | 7/2004 |
| WO | WO 2004057846 A1 * | 7/2004 |

OTHER PUBLICATIONS

"Call Processing", Cisco Unified Communications SRND (Based on Cisco Unified CallManager 4.x), Feb. 13, 2008, 8-1-8-32.
"What's New in SwyxWare 6.00", Swyx Education, 2006, 12 pages.
EP Application No. 08745258.7 : Extended European Search Report, Aug. 18, 2010, 7 pages.
Singh et al., "Failover and Load Sharing in SIP Telephony", Columbia University Computer Science Technical Reports, 2004, 1-18.

* cited by examiner

*Primary Examiner* — Fan Tsang
*Assistant Examiner* — Simon King
(74) *Attorney, Agent, or Firm* — Woodcock Washburn LLP

(57) ABSTRACT

A system provides redundant telephone call processing. A gateway receives a call and identifies a first server as having primary responsibility for servicing the call and a second server as having secondary responsibility for servicing the call. The gateway communicates the call to both the first server and the second server. The first server initiates recording of a voice message. The first server and the second server record the voice message. If the first server fails to indicate it has completed and stored the voice message in a timely manner, the second server stores the recorded voice message.

19 Claims, 7 Drawing Sheets

FULLY REDUNDANT CALL RECORDING

BACKGROUND

Voice mail systems, which allow users to amongst other things, record voice messages, has become ubiquitous in modern society. Voice mail systems have been used for years in the work setting. The technology has proven so useful that demand for it has moved into the individual consumer market. Many mobile phone service plans now include voice mail service as a standard feature.

Traditionally, voice mail systems have employed proprietary technology. For example, a voice mail system might have been designed, installed, and maintained by a single vendor. Systems may comprise hardware and software that was developed specifically for a particular voice mail installation and which is proprietary to the vendor.

There has been a movement away from proprietary hardware and software in the design of voice mail systems toward the use of standard hardware components and commercially available software.

SUMMARY

In the subject matter described herein, a system provides redundant call servicing, and in particular, redundant voice recording. An illustrative system may comprise a gateway for receiving calls and a plurality of servers for servicing the calls.

In an illustrative system, an exemplary gateway is programmed to receive voice calls and communicate the calls to a plurality of servers. The gateway may be programmed to receive calls in a first protocol such as, for example, a circuit switched protocol, and communicate the call in a second protocol such as, for example, an internet protocol. In an exemplary embodiment, the gateway may be programmed to select two or more servers to provide redundant voice recording.

A first exemplary server is communicatively coupled with the gateway. The first exemplary server may be, for example, a unified messaging server. The first exemplary server may be programmed with computer-readable instructions to manage receiving a voice call from the gateway, recording a voice message, and storing the voice message.

A second exemplary server is communicatively coupled with the gateway and is also communicatively coupled with the first exemplary server. The second exemplary server may also be, for example, a unified messaging server. The second exemplary server may be programmed with computer-readable instructions to manage receiving the call from the gateway, recording the voice message, monitoring tasks performed by the first server, and assuming responsibility for the call if the first server fails to timely complete a task.

When a call is received at the gateway, the first exemplary server and second exemplary server are identified as having responsibility for servicing the call. The first exemplary server is assigned primary responsibility for servicing the call and the second exemplary server is assigned secondary responsibility for servicing the call. The gateway communicates the call to both the first server and the second server. The first server services the call by performing the appropriate tasks associated with the desired call request. If the first server fails to timely complete a task associated with servicing the call, the second server may assume responsibility for servicing the call and complete the necessary tasks.

The first server may service a call by, for example, retrieving and playing a greeting, initiating the recording of a voice message, completing recording of a voice message, and storing the recorded voice mail. The second server may monitor the status of the first server in completing such tasks and if the first server fails to timely complete a task, the second server may assume responsibility for servicing the call. Further, while the first server undertakes to complete various tasks, the second server may simultaneously perform the same task. For example, as the first server records a voice message, the second server may also record the message. If the first server fails to timely complete recording and/or storing of a voice message, the second server may assume responsibility for the call and complete the recording and/or storing of the voice message.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

The subject matter disclosed herein is directed to systems and methods for providing redundant call servicing, and in particular, redundant voice mail recording. An illustrative system may comprise a gateway for receiving calls and a plurality of servers for servicing the calls.

When a call is received at the gateway, a first server and a second server are identified as having responsibility for servicing the call. The first server is assigned primary responsibility for servicing the call and the second server is assigned secondary responsibility for servicing the call. The gateway communicates the call to both the first server and the second server. The first server services the call by performing the appropriate tasks associated with the desired call request. If the first server fails to timely complete a task associated with servicing the call, the second server may assume responsibility for servicing the call and complete the necessary tasks.

While the first server undertakes to complete various tasks, the second server may simultaneously perform the same task. For example, as the first server records a voice message, the second server may also record the message. If the first server fails to timely complete recording and/or storing of a voice message, the second server may assume responsibility for the call and complete the recording and/or storing of the voice message.

The disclosed functionality may be implemented in commercial software and standard hardware. For example, in an embodiment of the disclosed systems and methods, the servers may be implemented as unified messaging servers. Further, the unified messaging servers may be implemented on off-the-shelf, low-cost computing hardware and may communicate using established networking technology and protocols.

Example Computing Arrangement

Figure 1:
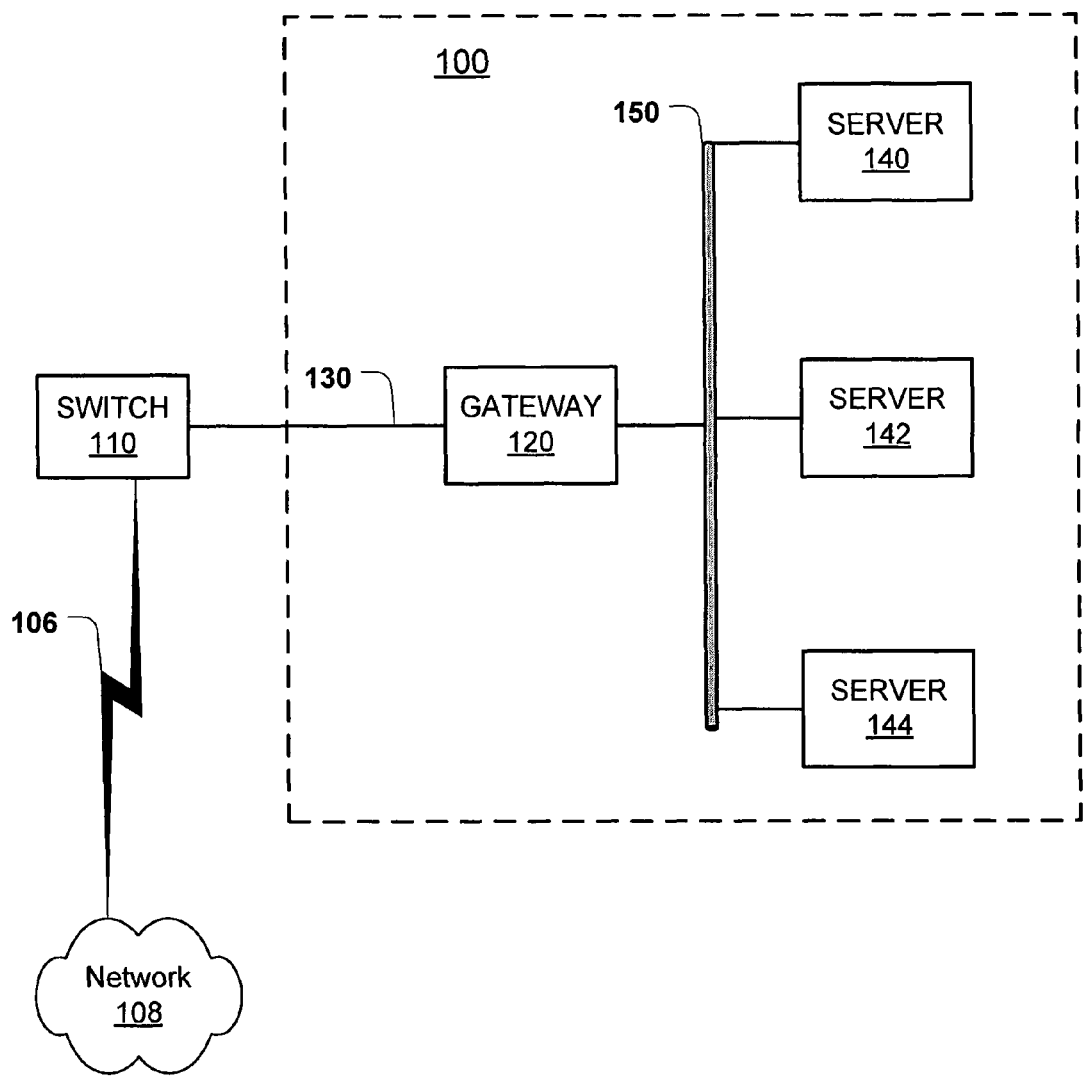
FIG. 1 is a network diagram of an illustrative computing arrangement in which aspects of the subject matter described herein may be implemented.

FIG. 1 illustrates an exemplary computing arrangement 100 suitable for providing redundant call processing. As shown, computing arrangement 100 is communicatively coupled with network 108. Network 108 is adapted to communicate voice calls and may be any type of network suitable for the movement of voice signals and/or data. For example, network 108 may be, or may comprise all, or a portion of, a public switched telephone network, the Internet, or any other network suitable for communicating voice information. Network 108 may comprise a combination of discrete networks which may use different technologies. For example, network 108 may comprise local area networks (LANs), wide area networks (WAN's), or combinations thereof. Network 108 may comprise wireless, wireline, or combination thereof.

Network 108 interfaces with switch 110 via communications link 106 to communicate voice calls to computing arrangement 100. Switch 110 may be any type of device that is operable to switch calls from network 108 to computing arrangement 100. In an exemplary embodiment, switch 110 may be, for example, a public branch exchange (PBX) switch. Switch 110 communicates information with gateway 120 via communications link 130, which may use, for example, any suitable network topology suitable for communicating call information.

Computing arrangement 100 comprises gateway 120 and servers 140, 142, and 144. Gateway 120 is adapted to provide an access point to machines including servers 140, 142, and 144 in computing arrangement 100. Gateway 120 may comprise any computing device suitable to route call information to plurality of servers 140, 142, and 144. In an example embodiment, gateway 120 is adapted to receive call information in a first protocol from switch 110 and communicate it to servers 140, 142, and/or 144 in another protocol. For example, gateway 120 may be a voice-over-internet-protocol (VoIP) gateway that is adapted to receive voice calls from switch 110 in a circuit switched protocol such as, for example, time division multiplexed (TDM) protocol, and to communicate calls to servers 140, 142, and/or 144 using packet switched protocols such as, for example, internet protocol. In an example embodiment, the functionality of gateway 120 and switch 110 may be combined in a common device.

Network 150 provides a communications link between and amongst gateway 120 and servers 140, 142, and 144. Network 150 may be any communications link that is suitable to provide communications between gateway 120 and servers 140, 142, and/or 144. Network 150 may comprise, for example, a fiber optic network that is suitable for communicating data in an internet protocol format. Further, network 150 may comprise components of networks such as, for example, WAN's, LAN's, and/or the Internet.

Servers 140, 142, and 144 are computing devices that are adapted to provide redundant voice recording. Each of servers 140, 142, and 144 may be any suitable computing device that has been programmed with computer-readable instructions to operate as described herein to provide redundant voice servicing. In an example embodiment, servers 140, 142, and 144 may programmed to operate as unified messaging (UM) servers adapted to integrate different streams of messages into a single in-box. For example, servers 140, 142, and 144 may be programmed to receive email, facsimile, voice, video, etc. and to make them available for retrieval from a plurality of device types. It is noted that while three servers 140, 142, and 144 are depicted in FIG. 1, any number of plurality of servers may be comprised in arrangement 100.

Gateway 120 and servers 140, 142, and 144 are adapted to communicate with each other using any number of protocols. Communication between and amongst gateway 120 and servers 140, 142, and 144 may take place, for example, using session initiation protocol (SIP) and real time protocol (RTP).

In an exemplary embodiment, upon receipt of a call at gateway 120, at least one of servers 140, 142, and/or 144 is identified to have primary responsibility for servicing a call request. At least a second of servers 140, 142, and 144 is identified as having secondary responsibility for servicing the request. The call is forwarded to the one or more servers that are identified as having primary responsibility for servicing the call. Also, the call is forwarded to the one or more servers identified as having secondary responsibility for servicing the call. If the one or more servers with primary responsibility fail to service the call in a timely manner, the one or more secondary servers assume responsibility for the call and complete the servicing including recording and saving any voice message.

Redundant Call Servicing Method

Figure 2:
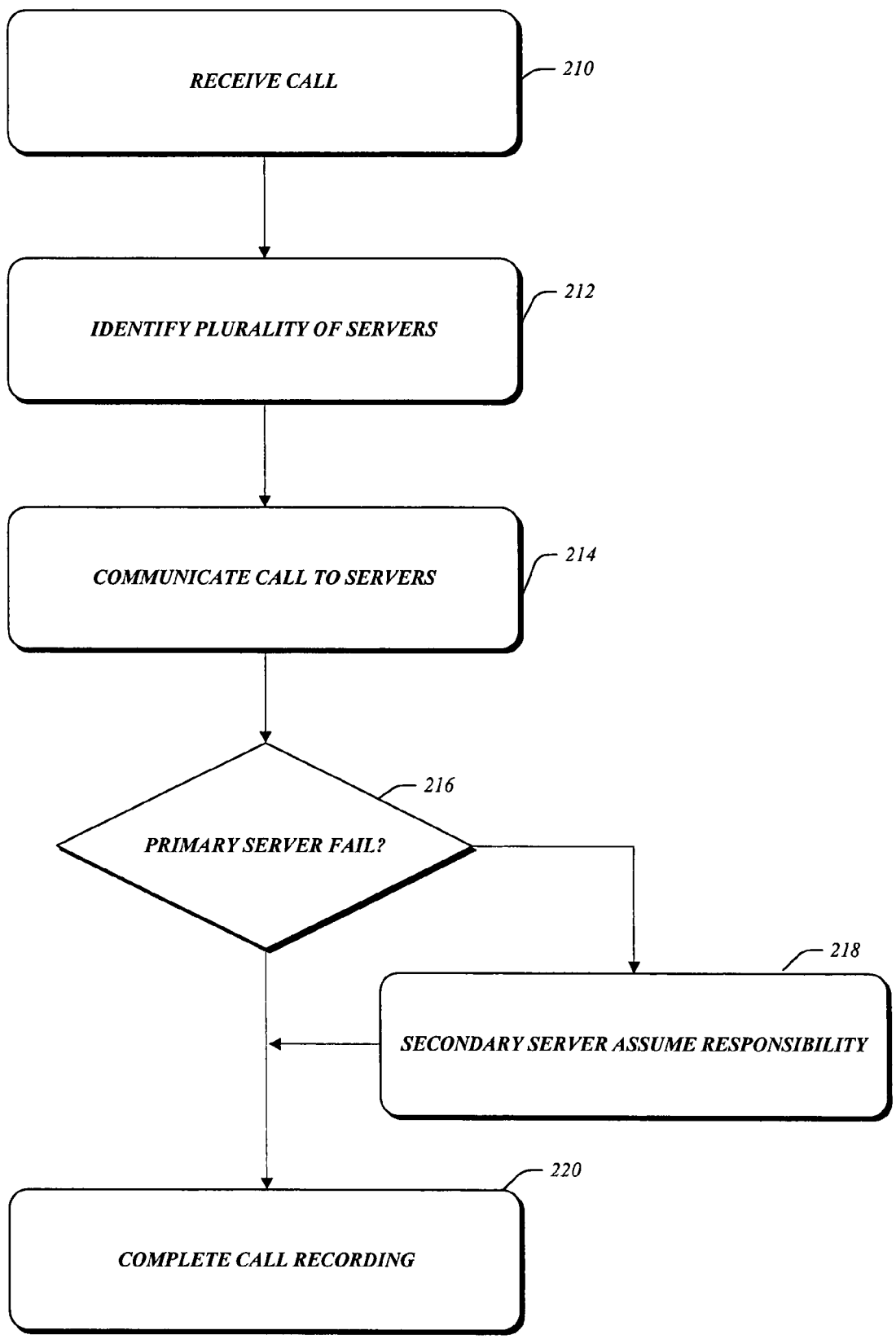
FIG. 2 is a flow diagram of a process for providing redundant call servicing.

FIG. 2 is a flow diagram of a process for providing redundant call recording. At step 210, gateway 120 receives a call from switch 110. The call may have originated from, for example, network 108.

At step 212, a plurality of servers 212 are identified to service the call. In an illustrative embodiment, servicing the call comprises providing redundant voice message recording. The step may comprise identifying a first server to take primary responsibility for servicing the call and identifying a second server to take secondary responsibility for servicing the call. The identification of which server(s) have primary responsibility and which server(s) have secondary responsibility may be accomplished in any number of ways. In an example embodiment, gateway 120 may be programmed to select one of servers 140, 142, and 144 to operate as the primary server and another to operate as the secondary server. In another example embodiment, gateway 120 may identify one of servers 140, 142, and 144 to operate as the primary server. The server identified as the primary server then identifies the server that will operate as the secondary server. For purposes of illustration, server 140 may be identified as the primary server and server 142 may be identified as the secondary server. Communications amongst gateway 120 and servers 140, 142, and 144 to establish relationships between the devices for servicing the call may be made using SIP.

At step 214, gateway 120 forks the call, by creating two RTP streams and communicates the call to a first or primary server 140 that was identified as having primary responsibility for servicing the request, and to a second or secondary server 142 that was identified as having secondary responsibility.

At step 216, it is determined at secondary server 142 whether primary server 140 failed to timely complete a step associated with servicing the call. For example, secondary server 142 determines whether primary server 140 failed to timely retrieve a greeting, play a greeting, record a voice message, and/or store a recorded voice message to storage. Secondary server 142 may determine whether or not a task had been timely completed by monitoring the status of primary server 140. The monitoring may be accomplished in any number of ways including, for example, communicating with primary server 140 regarding its most recent activities.

If primary server 140 fails to timely perform a task, at step 218, second server 142 assumes responsibility for servicing the call. If, for example, first server 140 has failed to play a recorded greeting in a prescribed period of time, at step 218, second server 142 assumes responsibility for servicing the call. If, for example, first server 140 fails to timely indicate that it has saved a voice message, at step 218, second server 142 assumes responsibility for servicing the call. Assuming responsibility for a call may comprise sending a message to primary server 140 to drop the call and/or to gateway 120 to drop the call from the primary server.

At step 220, servicing of the call is completed. In an illustrative embodiment, completing servicing of the call comprises completing the recording of the voice message including storing the voice recording for later retrieval. Thus, if at step 216, it is determined that primary server 140 timely performed all tasks in servicing the call, at step 220, primary server 140 completes the call recording. However, if it was determined at step 216 that primary server 140 had failed to timely complete a task associated with servicing the call and secondary server 142 had assumed responsibility at step 218, at step 220, secondary server 142 completes the call recording. This may include, for example, storing a recorded voice message.

Figure 3:
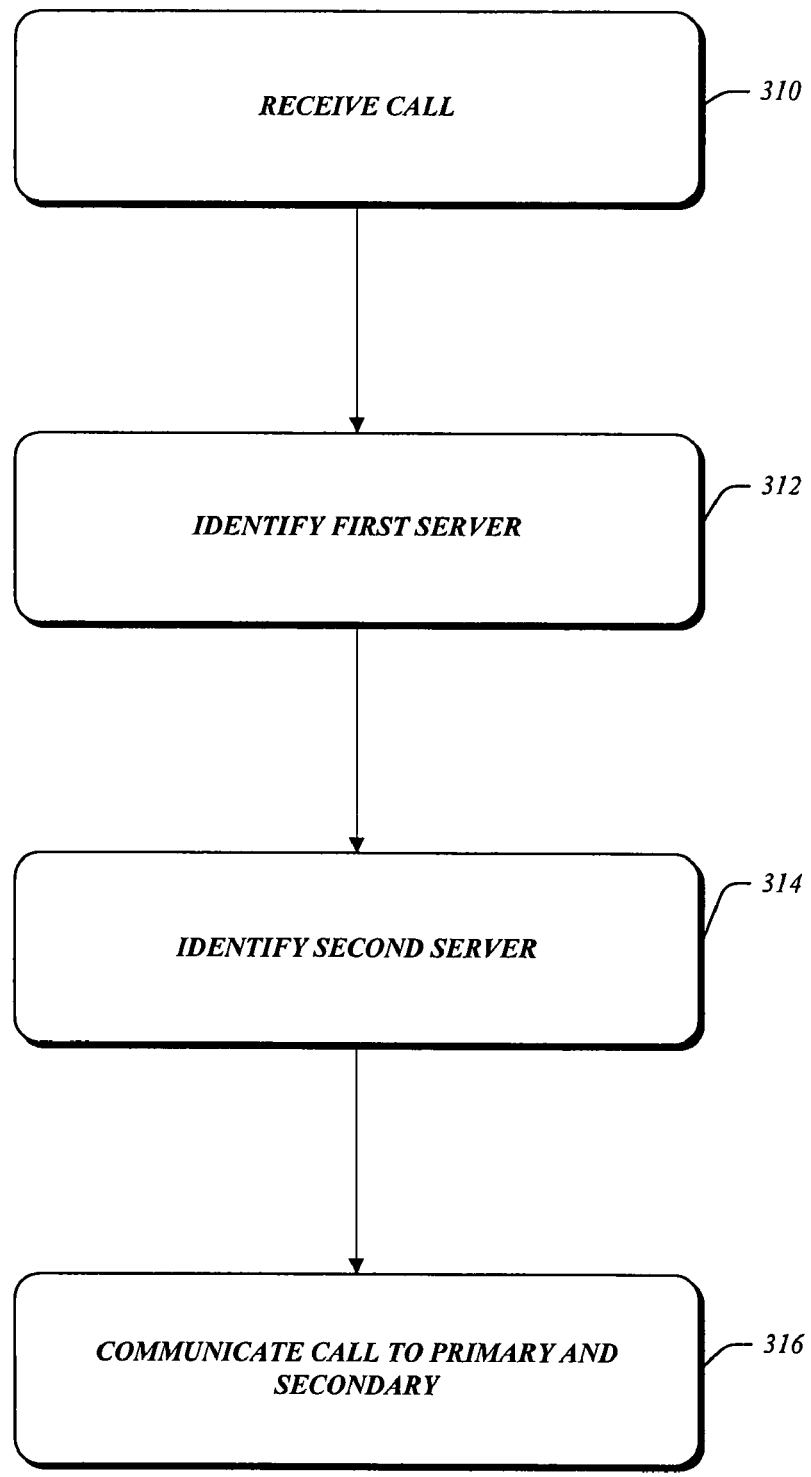
FIG. 3 is a flow diagram of a process for receiving calls for which redundant call servicing is to be provided.

FIG. 3 provides a flow diagram of a process for receiving calls for which redundant call servicing is to be provided. At step 310, a call is received at gateway 120. At step 312, gateway 120 identifies at least a first server to have primary responsibility for servicing the call. For purposes of illustration, server 140 may be identified as the primary server. It will be appreciated that more than one server may be identified as having primary responsibility for servicing a call. For example, several servers may be assigned primary responsibility for performing various tasks in connection with servicing a call.

At step 314, at least a second server is identified to have secondary responsibility. For purposes of illustration, server 142 may be identified as the secondary server. The second server may be identified in any number of ways. For example, in one potential embodiment, gateway 120 may identify a server to have secondary responsibility for servicing a call. In an alternative embodiment, the server that has been identified as the primary server may identify the secondary server. It will be appreciated that more than one server may be identified as having secondary responsibility for servicing a call. For example, several servers may be assigned to perform various tasks in connection with monitoring and servicing a call should the primary fail.

At step 316, gateway 120 communicates the call to the servers that have been identified as the primary server 140 and secondary server 142. The communication between and amongst gateway 120 and servers 140, 142 may be made using a protocol such as, for example, SIP.

Figure 4:
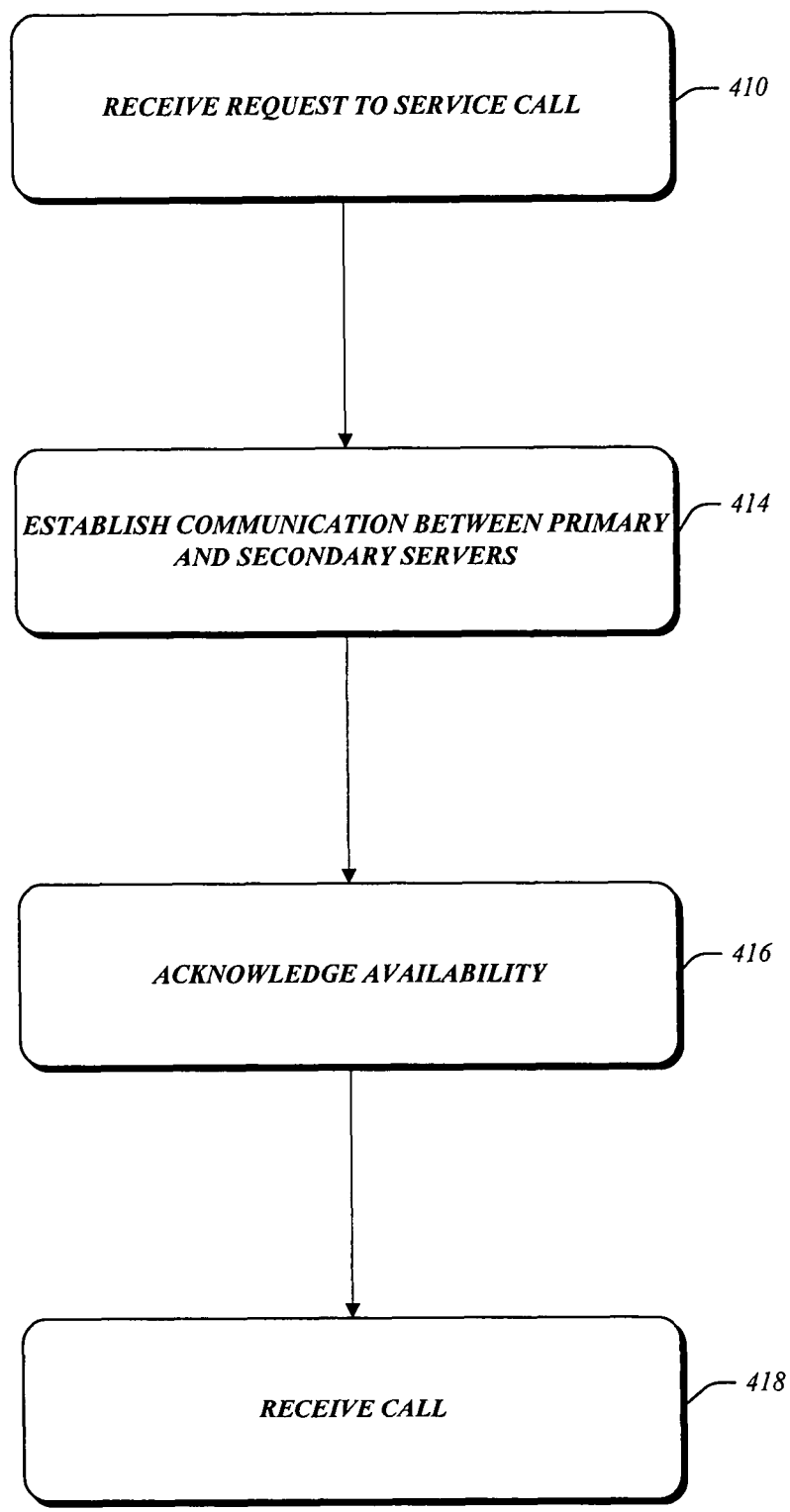
FIG. 4 is a flow diagram of a process of synchronizing a primary and secondary server in connection with a process of providing redundant call servicing.

FIG. 4 is a flow chart of a process of synchronizing a primary and secondary server in connection with a process of providing redundant call servicing. As shown, at step 410, a request from gateway 120 to service a call is received at primary 140 and secondary 142 servers.

At step 414, primary server 140 and secondary server 142 synchronize with each other so that each is prepared to perform their respective tasks in connection with servicing the call. Primary server 140 and secondary server 142 may communicate with each other in connection with synchronizing. Communications may be made between servers using a standard protocol such as, for example, session initiation protocol (SIP). In an embodiment, SIP may be used to establish a signaling channel between the servers for the length of the call.

At step 416, primary server 140 and secondary server 142 acknowledge to gateway 120 that they are available to service the incoming call. The communication with gateway 120 may be initiated using SIP protocol, with RTP protocol being used to communicate media or call information. At step 418, the call is received at each of primary server 140 and secondary server 142.

Figure 5:
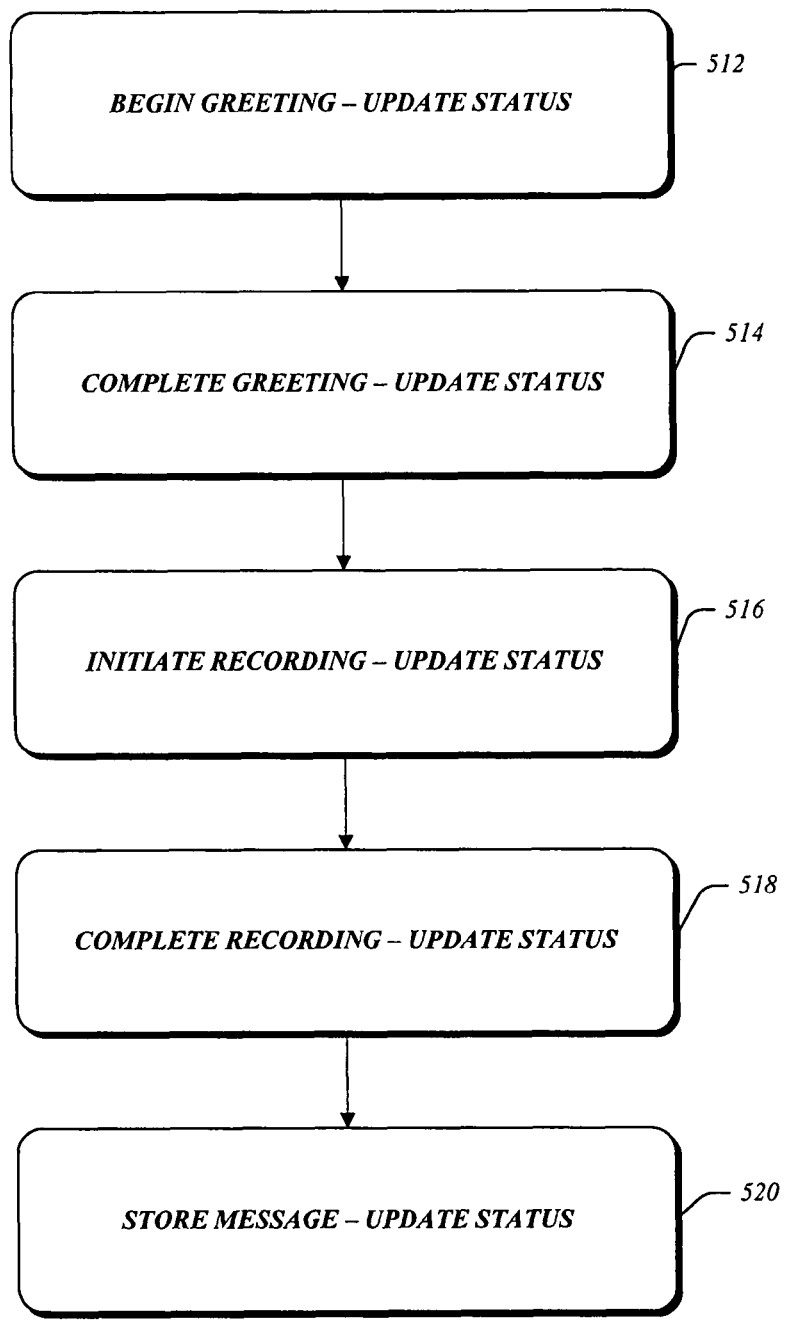
FIG. 5 is a flow diagram of a process for performing tasks in connection with redundant call servicing.

FIG. 5 is a flow chart of a process of performing tasks in connection with servicing a call for which redundant servicing has been requested. In an exemplary embodiment, redundant voice mail recording is provided. At step 512, primary server 140 retrieves and begins playing a recorded greeting for the phone number to which the call is directed. Also at step 512, primary server 140 updates its status as having begun the greeting. Primary server 140 may update its status in any number of ways such that the status of the tasks performed by primary server is available to secondary server 142. For example, primary server 140 may communicate with secondary server 142 to communicate that the greeting has begun being played. The communication may be made using SIP protocol. In another example embodiment, primary server 140 may update a location in memory that is accessible by secondary sever 142 to indicate that the greeting has begun.

At step 514, primary server 140 completes playing the recorded greeting and updates its status as having completed playing the greeting. The updated status is communicated to secondary server 142.

At step 516, primary server 140 initiates recording of a voice message and updates its status as having initiated recording of the message. Initiating recording of a message may comprise, for example, indicating to the caller that the system is prepared to receive the voice recording. This may be accomplished, for example, by communicating a tone to the caller. The updated status is communicated to secondary server 142. Secondary server 142 will likewise initiate recording of any message.

At step 518, primary server 140 and secondary server 142 complete recording of the voice message. Primary server 140 updates its status information as having completed recording of the message. The updated status is communicated to secondary server 142.

At step 520, primary server 140 stores the recorded message and updates its status as having completed storing the recorded message. The updated status is communicated to secondary server 142. Primary server 140 may store the recorded message in any manner suitable for preserving the recorded message for later retrieval.

Figure 6:
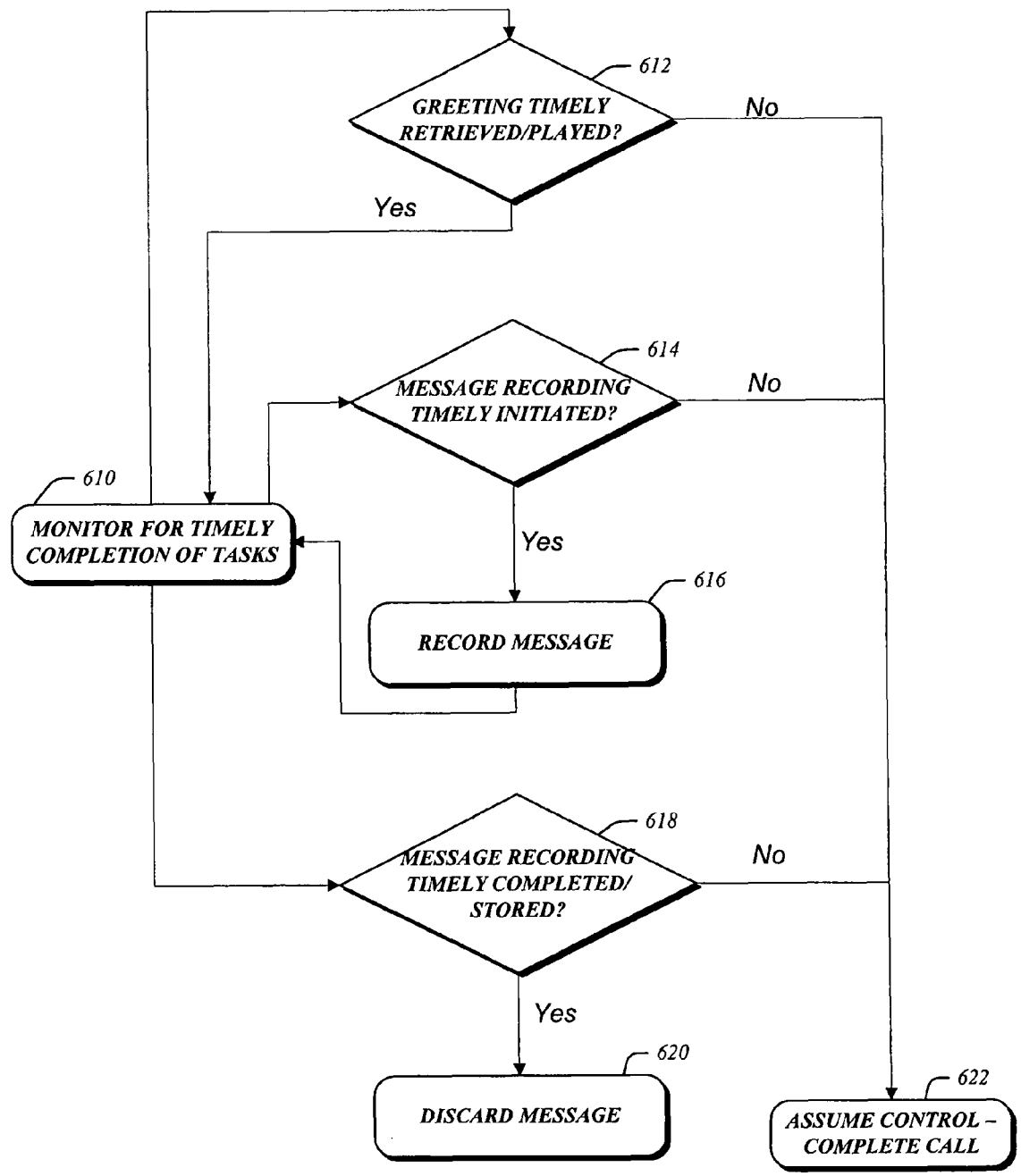
FIG. 6 is a flow diagram of a process for providing redundancy in call servicing.

FIG. 6 is a flow chart of a process for providing call redundancy in servicing voice mail recording. At step 610, secondary server 142 monitors the status of primary server 140 for timely completion of tasks. Secondary server 142 may monitor the status, for example, by receiving communications from primary server 140 as to the tasks that have been completed. The communications may be made, for example, using SIP protocol. In another example embodiment, secondary server 142 may monitor the status, for example, by checking a location in memory where the status of primary server 140 is recorded.

At step 612, secondary server 142 determines if the status indicates that primary server 140 has timely retrieved and played a greeting. For example, secondary server 142 may be programmed to anticipate that a recorded greeting should be retrieved by a predetermined length of time after the call was received. Similarly, secondary server 142 may be programmed to anticipate that the playing of the recorded greeting should be completed by a predetermined length of time after the call was received. If secondary server 142 determines that the status of primary server 140 indicates it has not timely retrieved and/or played the greeting, secondary server 142 assumes control or responsibility for completion of the call at step 622. If it were to assume control of the call, secondary server 142 may take any number of steps to insure that the call is properly serviced including, for example, instructing primary server 140 to drop the call and retrieving and playing the recorded greeting at server 142. Secondary server 142 may subsequently perform the remaining steps in servicing the voice mail. If at step 612, secondary server 142 determines that the primary server 140 has timely retrieved and played the greeting, secondary server 142 continues to monitor for timely completion of tasks at step 610.

At step 614, secondary server 142 determines if the status indicates that primary server 140 has timely initiated recording of a voice message. For example, secondary server 142 may be programmed to check that the initiation of the voice message recording begins by a particular length of time after the call was received or after the greeting was completed. If secondary server 142 determines that the status of primary server 140 indicates primary server 140 has not timely initiated message recording, secondary server 142 assumes control or responsibility for completion of the call at step 622. If it were to assume control of the call, secondary server 142 may take any number of steps to insure that the call is properly serviced including, for example, instructing primary server 140 to drop the call and initiating the recording of the message at server 142. Secondary server 142 may subsequently perform any remaining steps in servicing the voice mail.

If at step 614, secondary server 142 determines that primary server 140 has timely initiated recording of a voice message, at step 616, secondary server 142 also begins recording the message. Thereafter, secondary server 142 continues to monitor for timely completion of tasks at step 610.

At step 618, secondary server 142 determines if the status indicates that primary server 140 has timely completed recording and storing the voice message. For example, secondary server 142 may be programmed to check that the voice message recording is completed and the voice mail stored by a particular length of time after the call was received or after the greeting was completed. Secondary server 142 can tell that the voice mail recording should be complete by the signaling it receives about the call from gateway 120. Primary server 140 and secondary server 142 both talk to gateway 120 and both are independently informed that the recording can end.

If secondary server 142 determines that the status of primary server 140 indicates primary server 140 has not timely completed recording and storing the voice message, secondary server 142 assumes control or responsibility for completion of the call at step 622. If it were to assume control of the call, secondary server 142 may take any number of steps to insure that the call is properly serviced including, for example, instructing primary server 140 to drop the call and completing recording and storing the voice message at server 142. Secondary server 142 may subsequently perform any remaining steps in servicing the voice mail.

If at step 618 secondary server 142 determines that the message has been timely recorded and stored, at step 620, secondary server 142 discards the copy of the message that it had recorded.

Example Computing Environment

Figure 7:
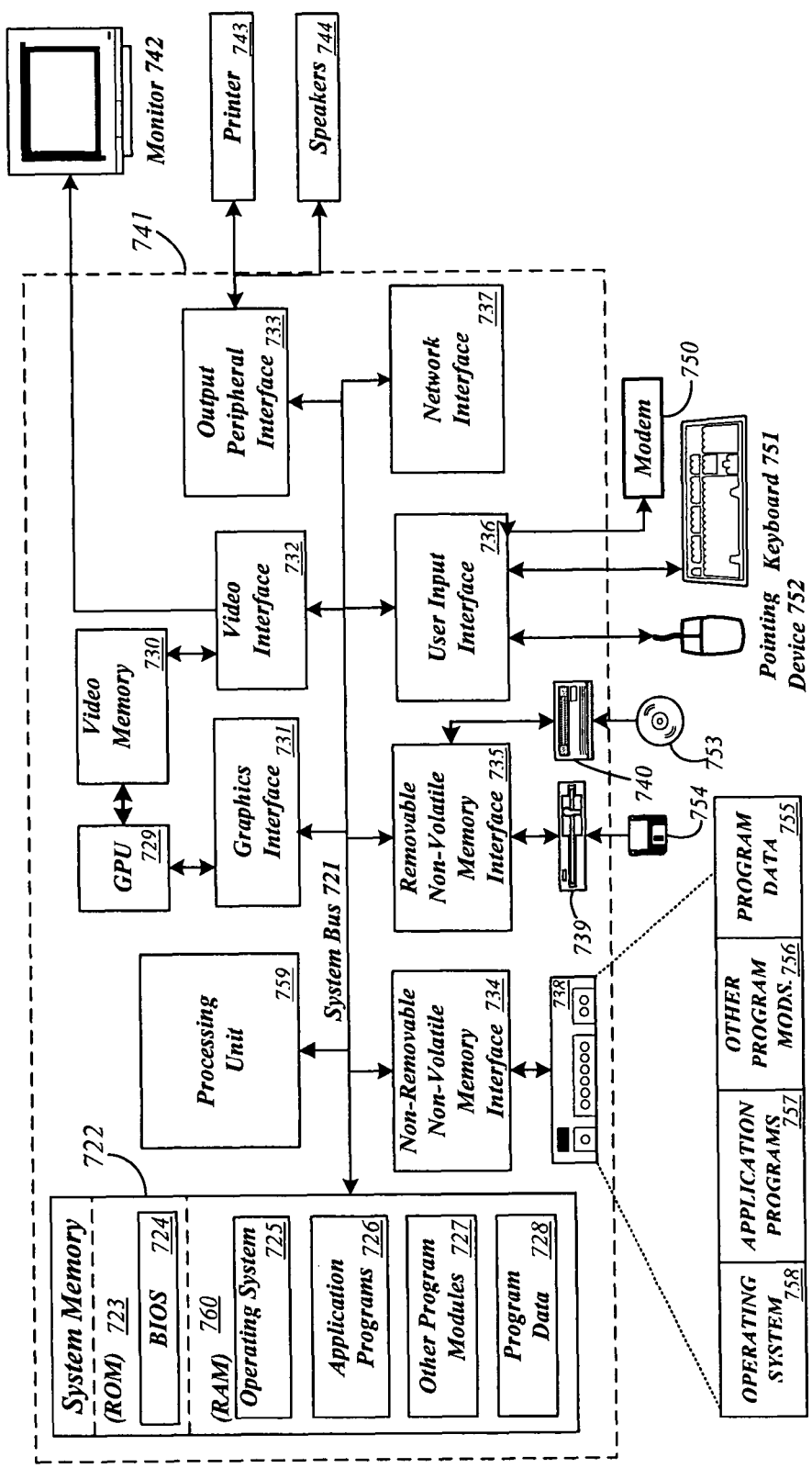
FIG. 7 is a block diagram of a computing environment with which aspects of the subject matter described herein may be deployed.

FIG. 7 depicts an example computing environment 720 that may be used in an exemplary computing arrangement 100. Example computing environment 720 may be used in a number of ways to implement the disclosed methods for redundant call servicing described herein. For example, computing environment 720 may operate as computer servers 140, 142, 144 to provide redundant call servicing. In an example embodiment, computing environment 720 may operate as gateway 120.

Computing environment 720 is only one example of a suitable computing environment and is not intended to suggest any limitation as to the scope of use or functionality of the subject matter disclosed herein. Neither should the computing environment 720 be interpreted as having any dependency or requirement relating to any one or combination of components illustrated in the example operating environment 720.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, portable media devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 741. Components of computer 741 may include, but are not limited to, a processing unit 759, a system memory 722, and a system bus 721 that couples various system components including the system memory to the processing unit 759. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media can be any available media that can be accessed by computer 741 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 741. Communication media typically embodies computer readable instructions, data structures, program modules or other data in a modulated data signal such as a carrier wave or other transport mechanism and includes any information delivery media. The term "modulated data signal" includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 722 includes computer storage media in the form of volatile and/or nonvolatile memory such as read only memory (ROM) 723 and random access memory (RAM) 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 7 illustrates operating system 725, application programs 726, other program modules 727, and program data 728.

Computer 741 may also include other removable/non-removable, volatile/nonvolatile computer storage media. By way of example only, FIG. 7 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 7, provide storage of computer readable instructions, data structures, program modules and other data for the computer 741. In FIG. 7, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

Thus a system for providing redundant call servicing has been disclosed. In a disclosed embodiment, the system provides redundancy during the entire length of servicing of voice calls, and in particular, redundancy during voice mail recording. Those skilled in the technical area will appreciate that the system may be employed to provide redundancy during scenarios other than voice mail recording. For example, the redundant call servicing system may be employed to service voice mail users calling into check voice mail. Indeed, the disclosed systems and methods for sharing key state transitions between a primary and secondary server can be employed to provide redundancy for most, if not all, interactive voice response (IVR) services.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of recording voice messages performed at least in part on a computing system, comprising:
   receiving a call at a gateway;
   identifying a plurality of servers to service the call, the identifying a plurality of servers comprising identifying, at a gateway, a first of the plurality of servers with primary responsibility for servicing the call, and identifying, at the first of the plurality of servers, at least a second server of the plurality of servers to have secondary responsibility for servicing the call;
   communicating the call to each of the plurality of servers;
   recording a voice message at each of the plurality of servers; and
   if the first of the plurality of servers fails to timely perform a task in connection with recording the call as detected by the second server, servicing the call at the second of the plurality of servers.

2. The method of claim 1, wherein identifying a plurality of servers to service the call comprises identifying at least a third server, the third server providing redundant backup to the second server.

3. The method of claim 1, further comprising wherein recording the call to each of the plurality of servers comprises the first of the plurality of servers communicating its status to the second of the plurality of servers.

4. The method of claim 3, wherein the first of the plurality of servers communicating its status to the second of the plurality of servers comprises updating a location in memory that is accessible by the second of the plurality of servers.

5. The method of claim 1, wherein servicing the call at a second of the plurality of servers comprises recording a voice message and managing storing of the voice message.

6. The method of claim 1, further comprising:
   at the first of the plurality of servers, managing retrieval of a greeting for a called number;
   at the first of the plurality of servers, managing playing of the greeting;
   at the first of the plurality of servers, managing initiation of recording the voice message; and
   at the first of the plurality of servers, managing storing the voice message.

7. The method of claim 6, further comprising:
   at the second of the plurality of servers, monitoring tasks performed at the first of the plurality of servers in connection with servicing the call;
   at the second of the plurality of servers, identifying a failure to timely perform a task at the first of the plurality of servers; and
   at the second of the plurality of servers, assuming responsibility for servicing the telephone call at the second server in response to identifying a failure to timely perform a task at the first of the plurality of servers.

8. The method of claim 7,
   wherein identifying a failure to timely perform a task at the first of the plurality of servers comprises identifying a failure to timely manage completion of recording the voice message, and
   wherein assuming responsibility for servicing the telephone call comprises managing completion of recording the voice message and storing the voice message.

9. The method of claim 7,
   wherein identifying a failure to timely perform a task at the first of the plurality of servers comprises identifying a failure to timely manage storing of the voice message, and
   wherein assuming responsibility for servicing the telephone call comprises managing completion of storing the voice message.

10. A system for voice message recording, comprising:
    a gateway, said gateway adapted to communicate a voice call to a plurality of servers;
    a first server communicatively coupled with said gateway, said first server comprising computer-readable instructions for identifying a second server to have secondary responsibility for servicing a call, receiving a voice call from said gateway, recording a voice message, and storing said voice message; and
    a second server communicatively coupled with said gateway and said first server, said second server comprising computer-readable instructions for receiving said call from said gateway, recording said voice message, monitoring tasks performed by said first server, and assuming responsibility for the call if the first server fails to timely complete a task.

11. The system of claim 10, wherein said second server comprises computer-readable instructions for storing said voice message if the first server fails to timely complete storing said voice message.

12. The system of claim 10, wherein said first server and said second severs are unified messaging servers.

13. The system of claim 10, wherein said gateway is adapted to select said first server.

14. The system of claim 10, wherein said first server comprises computer-readable instructions for communicating its status to said second server.

15. One or more computer-readable storage media having stored thereon computer-readable instructions that, when executed by a computing system, cause the computing system to perform operations comprising:
    identifying, at a gateway, a first server with primary responsibility for servicing a call, and identifying, at the first server, at least a second server to have secondary responsibility for servicing the call;
    performing tasks in servicing a phone call at the first server;
    monitoring at the second server tasks performed by the first server;
    identifying at the second server a failure to timely perform a task at the first server; and
    assuming responsibility for servicing the telephone call at the second server in response to identifying a failure to timely perform a task at the first server.

16. The one or more computer-readable storage media of claim 15, wherein identifying at the second server a failure to timely perform a task at the first server comprises identifying at a second server a failure to timely perform at least one of the following: present a recorded greeting; begin recording of a message; and complete recording of a message.

17. The one or more computer-readable storage media of claim 15, wherein assuming responsibility for servicing the telephone call at the second server in response to identifying a failure to timely perform a task at the first server comprises completing the call.

18. The one or more computer-readable storage media of claim 15, further comprising computer-readable instructions that, when executed by a computing system, cause the computing system to perform operations comprising simultaneously performing at the second server tasks being performed at the first server.

19. The one or more computer-readable storage media of claim 18, wherein simultaneously performing at the second server tasks being performed at the first server comprises recording a message at the second server.

* * * * *